Figure 1:
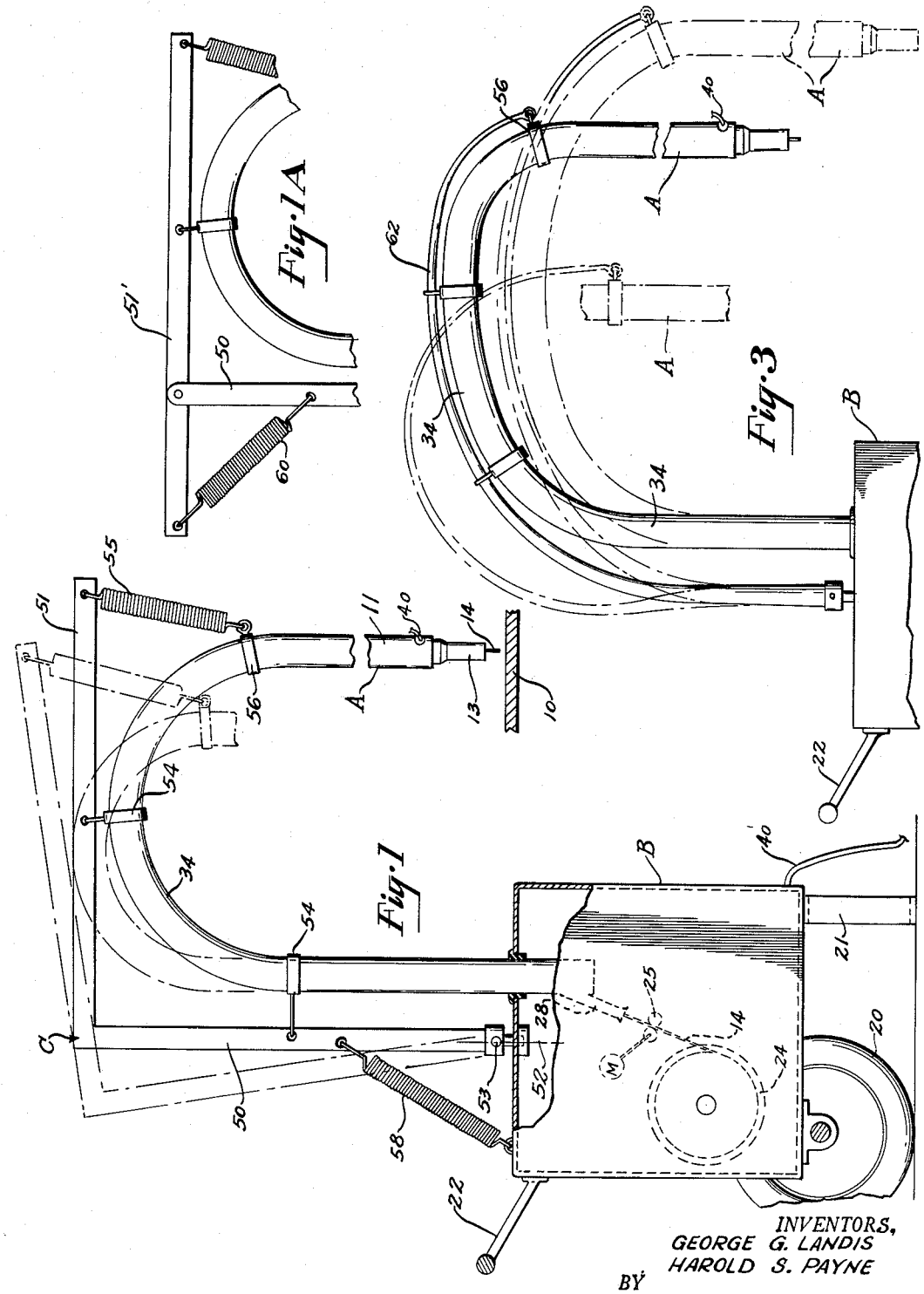

May 29, 1956    G. G. LANDIS ET AL    2,748,236
APPARATUS FOR CONTINUOUS ARC WELDING
Filed Nov. 12, 1952    2 Sheets-Sheet 2

INVENTORS,
GEORGE G. LANDIS
HAROLD S. PAYNE
BY
Alfred C. Body ered as a corporation of Ohio

United States Patent Office 2,748,236
Patented May 29, 1956

2,748,236

APPARATUS FOR CONTINUOUS ARC WELDING

George G. Landis, South Euclid, and Harold S. Payne, Cleveland Heights, Ohio, assignors to The Lincoln Electric Company, Cleveland, Ohio, a corporation of Ohio Application November 12, 1952, Serial No. 319,907

17 Claims. (Cl. 219—8)

This invention pertains to the art of welding and, more particularly, to welding apparatus.

The invention is particularly adaptable in the field of continuous arc welding wherein a welding head is manually guided along the seam to be welded and will be described with particular reference thereto, although it will be appreciated that the invention has broader applications.

In the field of manual arc welding, it has been conventional in the past to provide a portable welding head which is continuously supplied with an electrically energized, small-diameter, wire electrode from an electrode reel mounted on a remotely located base unit and fed to the welding head through long flexible conduits. If deep flux welding were to be performed, the welding head also generally included a flux hopper from which flux could be continuously fed along the seam to be welded or some means on the base unit was provided to continuously feed flux through the welding head onto the seam.

In all of such apparatus, the weight of the welding head has also been a problem, which weight the welding operator had to continuously support during a long, continuous, arc-welding operation. Supporting this weight quickly fatigued the operator, making his relief necessary or inferior welds would result.

Furthermore, the conduits connecting the welding head with the base unit were, at best, only semiflexible and as they draped across the floor, between the base unit and the welding head, their weight was added to that of the welding head and their stiffness tended to always exert a force on the welding head which the welding operator was required to overcome so that instead of being relaxed during the welding operation, he was instead continually under a tension which quickly tired him. For the maximum efficiency and minimum fatigue during a welding operation, it is necessary that the welding head have a maximum of freedom of movement and require a minimum effort on the part of the welding operator to guide it along the weld seam.

Various proposals have been made for supporting the welding head relative to the workpiece during a welding operation but, so far as we know, no one of them provides complete freedom of movement of the welding head such as is provided by the present invention, namely, substantially unrestricted movement of the welding head in both a horizontal and vertical direction so that the operator can weld under a minimum of tension and a maximum amount of ease.

The present invention contemplates welding apparatus which overcomes all of the above-named objections and others and provides welding apparatus of the type referred to wherein a welding head of any size or shape may be either in part or fully supported by an overhead support and, yet, the welding head may be freely movably within a limited range in both a horizontal and vertical direction.

In accordance with the present invention, welding apparatus is providing including, in combination, a portable welding head, a relatively fixed base unit and support means on the base unit from which the welding head is suspended, these supporting means including a mast-like member mounted on the base unit and extending vertically and horizontally therefrom, the support means being so formed and constructed that the remote end from the base unit is movable relatively freely within a limited range in all directions, this free movement, particularly in the horizontal direction being obtained by having the mast member, in effect, movable about an apparent horizontal axis adjacent to the base unit, as well as about a vertical axis. This movement can be obtained in a number of different ways such as by providing a rigid mast member pivoted about a horizontal axis at the base unit or by providing resilient or spring-like mast members which bend at the outer end to a horizontal position under the weight of the welding head and which, under the effect of horizontal forces applied to the end, can flex adjacent the base unit about a horizontal axis to give the desired freedom of movement of the welding head.

The free movement vertically can also be obtained by the use of coiled springs extending between the welding head and the end of the mast-like member, the construction of the spring being such that substantial displacements thereof can be obtained with relatively small changes in the forces required to extend the spring, or the entire mast member can be constructed of a single unitary spring member such as a long, conically-shaped, helical coil spring having the desired spring-like characteristics built thereinto so that the outer end of the mast is relatively freely movable both horizontally and vertically while requiring relatively small changes in the over-all forces to deflect it.

The principal object of the invention is the provision of new and improved supporting means for a portable welding head which enables the welding head to be freely moved about within a limit range in all directions with a minimum of force required to be applied by the welding operator.

Another object of the invention is the provision of new and improved welding apparatus including a relatively fixed base unit and a portable welding head connected to the base unit through flexible members, the base unit having supporting means for the welding head which enables the welding head to be freely moved within a limited range in all directions.

Another object of the invention is the provision of apparatus of the type described wherein the base unit has a mastlike member mounted thereon extending vertically upwardly and horizontally therefrom so that a welding head may be suspended from the end thereof, the mast member being so constructed and arranged that the outer end thereof is freely movable within a limited range in all directions.

Still another object of the invention is the provision of overhead supporting means for a portable welding head, the supporting means including resilient members to enable the welding head to be freely moved, the resilient members being so constructed and arranged as to have a maximum amount of deflection with a minimum change in the force required to deflect the resilient members.

The invention may be comprised in certain parts and arrangements of parts, preferred embodiments of which will be described in detail in this specification and illustrated in the accompanying drawing which is a part hereof, and wherein:

Figure 1 shows a side elevational view partly in section of welding apparatus embodying the present invention; and Figures 1A, 2, 3 and 4 are all views somewhat similar to Figure 1 showing alternative embodiments of the invention.

Referring now to the drawings wherein the showings are for the purposes of illustrating the invention only and not for the purposes of limiting it, Figure 1 shows a portable welding head A, a semifixed base unit B and support means C mounted on the base unit B from which the welding head is suspended at a point remote from the base unit B.

The welding head A shown in Figure 1 forms no part of the present invention and is shown purely for the purpose of illustrating a welding head with which the present invention is operable. Suffice it to say that the welding head A includes an elongated flux hopper 11, from the lower end of which a granular flux is adapted to be flowed onto a seam of a workpiece 10 to be welded and also includes an electrode nozzle from which one or a plurality of electrodes 14 are adapted to be advanced toward the workpiece 10. The welding head A is connected to the base unit B through long flexible members, including an outer flexible hose 34 and electrode conduit 28 in an overhead fashion by means of the support means C as will be presently described. The electrode wire 14 may be energized by means of an electric current-carrying cable extending through the hose 34 or, and preferably, an insulated wire 40 extends from the welding head A, across the floor to the base unit B, this cable 40 serving both the function of carrying electric currents to the welding head A and an additional function of limiting the radius of movement of the welding head A away from the base unit B such that the welding operator cannot put undue strains on the support means C by attempting to move the welding head A distances away from the base unit B further than the apparatus was originally designed for. The electrode wire 14, however, is preferably advanced from a reel 24 on the base unit B through a long flexible conduit 28 interiorly of the tube or hose 34 to the welding head A. Motor driven rolls 25 advance the electrode into the conduit 28.

In the embodiment of the invention shown, the base unit B is generally in the form of a wheeled dolly, including wheels 20, legs 21 and a handle 22, such that the entire apparatus, including the welding head, can be freely moved from place to place. Obviously, any other form of dolly could be used other than the one shown.

As stated, one of the problems with portable welding apparatus of the type described is that the weight of the welding head and the flexible cables connecting the welding head with the base unit, together with the inherent stiffness thereof exert forces on the welding head which must be counteracted by the welding operator during the course of a welding operation, which forces rapidly tire the operator and cause him to make inferior welds. Also, the operator, being accustomed to freely movable welding heads such as was the case when welding with ordinary hand-held coated electrodes, objects to any restrictions on the freedom of movement of the welding head. The present invention contemplates support means C for supporting the welding head A which enables the welding head to be freely moved in all directions and which requires the welding operator to exert a minimum of force on the welding head to effect long, continuous welds.

In the embodiment of the invention shown in Figure 1, the support means C is comprised of a vertically extending member 50 and a horizontally extending member 51, the outermost end of the horizontal member 51 being located generally over the area to be welded. As shown, the vertically extending member 50 is mounted at its lower end on the base unit B in a manner so as to be pivoted about a vertical axis 52 and a horizontal axis 53 adjacent to the base unit B, the particular details of the construction of the pivoted mounting forming no part of the present invention and, thus, will not be described in detail herein.

The hose 34 may be supported elsewhere on the support means C by any suitable means such as the rings 54 shown surrounding the hose and fastened to the members 50, 51.

The welding head A is suspended from the outer end of the support means C by means of a coil spring 55 connected at its upper end to the member 51 and at its lower end to a ring member 56 surrounding the flexible hose 34 at a point just above the enlargement 40.

The spring 55 is, in accordance with the invention, of a type having a minimum change of force required for each unit of deflection such as would be true of a multi-turn helical coil spring. Thus, the spring 55 under the weight of the welding head A will elongate a sufficient amount to offset and completely support the welding head A at some position preferably intermediate the workpiece level and the floor on which the base unit B is supported. The welding head may then be moved vertically through substantial distances in either direction with only a moderate degree of force required to effect such movement.

With this arrangement, it will be seen that all flexible elements connecting to the welding head A approach the head from a generally vertical direction, i. e., a direction perpendicular to the line of the seam to be welded. With this arrangement, the flexible conduit 28, the electrode wire 14, and the flexible hose 34 can exert a minimum of leverage on the welding head A at an angle to the weld seam as the welding operator tends to direct the welding head along the seam.

A spring 58 having characteristics similar to the spring 55 extends from a point on the vertically extending member 50 spaced from the axis 53 to a point on the base unit B spaced from the vertical axis 52 and on the side of the base unit remote from the area where the weld head A will generally be positioned, which spring is for the purpose of bearing the weight of the welding head but still permitting the outer end of the horizontal member 51 to move in a plane through the axis 52, this movement being also resisted in a resilient manner by the spring 58. However, with this arrangement, it will be noted that if the operator desires to move the welding head A closer to the base unit B, he can do so by simply exerting a slight force on the welding head A in that direction; in which event, the vertical member 50 will pivot about the axis 53 in a counterclockwise direction as viewed in Figure 1, the spring 58 partially collapsing to continue exerting a pull on the vertical member 50 to offset the weight of the welding head exerted here. In a like manner, if it is desired to move the welding head A away from the base unit B, this can be readily done by exerting a force on the welding head A in that direction; in which event, the vertical member 50 will pivot in a clockwise direction, the spring 58 extending slightly to permit this pivoting movement. Also, during all of such horizontal movements of the welding head A, the spring 55 will be lengthening or contracting to continue exerting a supporting action for the welding head A. Also, because the vertical member 50 is pivoted about the vertical axis 52, it will be appreciated that the welding head A can be moved within an arc about the base unit B with the vertical axis 52 as a center. It will be appreciated that the outer end of the horizontal member 51 is thus substantially universally movable within a limited range by the exertion of relatively small amounts of force thereon, any vertical movements of the end of the horizontal member 51 being compensated for by extensions or contractions of the spring 55, the suspension point for the weld head A thus moving freely to remain generally always directly over the weld area.

It will thus be seen that a support point for the welding head is provided which is resiliently movable in a maximum number of directions, such movement being relatively free and unrestrained. Additionally, the outer end of the horizontal member 51 is also resiliently movable about a point or axis effectively adjacent to the base unit, thus giving, in effect, a long movable arm for supporting the welding head A.

Figure 1a shows an embodiment of the invention somewhat similar to the embodiment shown in Figure 1 but slightly modified. In this embodiment, the vertical member 50 of the support means remains as in the preferred embodiment of Figure 1, but the horizontally extending member indicated by the numeral 51', instead of being rigidly supported relative to the vertical member 50, is pivoted midway between its ends to the upper end of the vertical member 50 and a long helical coil spring 60 extends from the end of the vertical member 51 remote from the ends supporting the welding head A to a point on the vertical member 50 approximately midway of its length. It will thus be seen that additional freedom of movement of the end of the horizontal member 51' can be obtained. Obviously, the number of pivot points in the mast member may be increased over that shown with resilient means to permit pivoting of the various members while still providing a resilient force to resist the pull of the weight of the welding head A. Obviously, the various pivot points which would normally consist of a pin or shaft extending between the two members to support them relative to each could, instead, be in the form of the resilient member itself interconnecting the two members and serving both the function of allowing the two members to pivot relative to each other, while, at the same time, resiliently opposing such pivoting movement so that the assembled, relatively pivoted members can support the weight of the welding head A.

Figure 2:
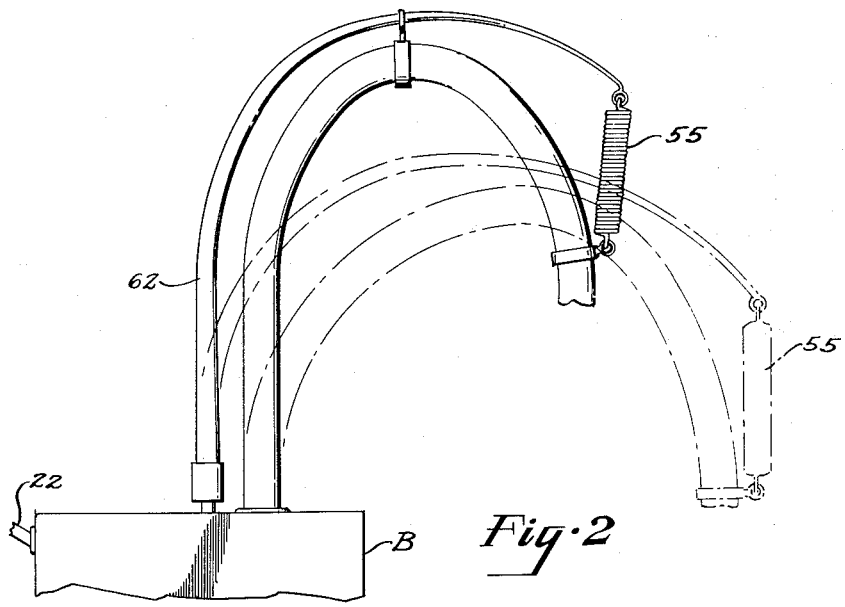

Figure 2 shows an alternative embodiment of the invention illustrating a more specific embodiment of the modification just referred to. In Figure 2, the support means is in the form of a single unitary mast member 62 which is formed throughout its length of resilient spring-like material, the thickness of the mast tapering from the base end which is mounted on the base unit B to the outermost end from which the welding head A is supported by means of a long helical coil spring 55. In this embodiment, the normal unflexed position of the mast 62 is vertical but the mast is made that soft and resilient that when the weight of the welding head A is suspended from the end of the mast 62, the mast then assumes generally the positions shown in Figure 2, namely, the mast has vertically extending members which gradually merge into horizontally extending members. Such a spring-like member has characteristics somewhat similar to the rigid mast member of Figure 1; i. e., it is pivoted about an axis effectively adjacent the base unit B. Thus, as forces are applied to the outer end of the mast member 62, the mast can bend or flex generally over its entire length and, particularly, in the portions adjacent to the base unit B. The outermost end of the mast member 62 is, thus, resiliently mounted and movable about an axis of the point effectively adjacent to or within the base unit B.

Figure 3 is a view of welding apparatus somewhat similar to that shown in Figure 2, with the exception that the coil spring 55 extending between the outer end of the mast member 62 has been eliminated and the end of the mast member 62 is connected directly to the ring 56 surrounding the hose 34. Normally, the mast member 62 shown in Figure 3 would be of a softer construction than the mast member 62 shown in Figure 2 for the reason that, in the absence of the coil spring 55, the total effective spring length is much shorter and if the same softness of spring action, namely, a small change of force for substantial deflections of the spring is to be obtained, the spring member 62 would have to have slightly different flexing characteristics. It will also be seen that with the mast member shown, the outer end thereof is resiliently movable about an axis or point effectively adjacent to the base unit B such that the outer end will have a maximum freedom of movement to thus suspend the welding head and permit it to be freely moved about with a minimum of force being exerted thereon by the welding operator.

Figure 4:
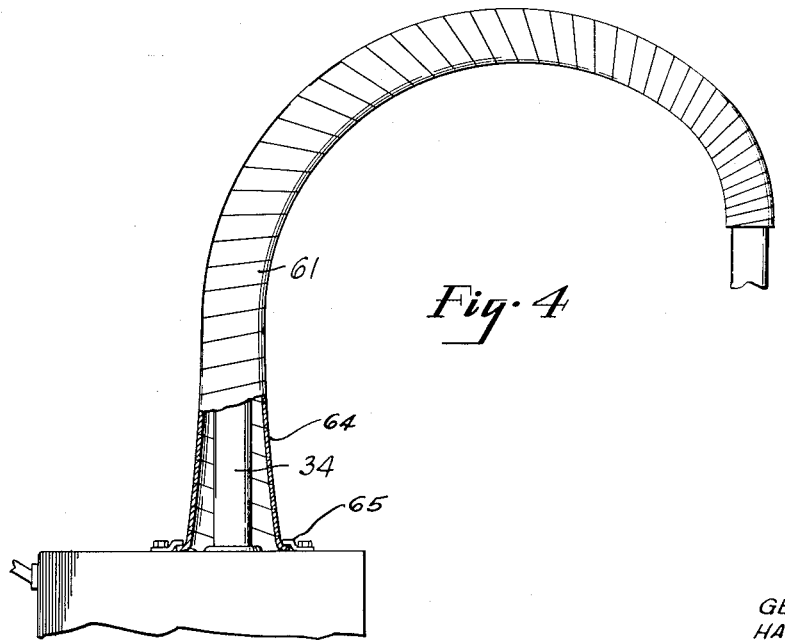

Figure 4 shows a still further modified embodiment of the invention. In this embodiment, the mast member 61 is formed from a long, multiturn, tapering, helical, coil spring 64 mounted rigidly on the base unit B by any suitable means such as the brackets 65 and which extend concentrically about the hose 34 from the base unit B to a point just short of the weld head, not shown. In some respects, this type of mast member is preferred over those shown and illustrated in Figures 1 to 3. In this embodiment, the pivoting action of the mast member about a point or horizontal axis effectively adjacent the base can be readily obtained and the soft springing, namely, a small change in force for a unit deflection, can be readily obtained by proper design of the cross-sectional area and shape of the wire or rod making up the individual turns or by varying the radius of the individual turns over the entire length of the spring. Also, the pivoting about a vertical axis is obtained without providing an actual pivoted joint construction.

In all of the embodiments of the invention, the support means C have an outer or free end resiliently supported relative to the base unit B so as to be freely movable in a plurality of directions, thereby enabling the welding head to be moved in a plurality of directions with a minimum of force required to be exerted thereon by the welding operator.

The cable 40 preferably has a length such as to restrain the movement of the welding head A outwardly from the base unit B, thus preventing the welding operator from exerting such a pull on the welding head A which, through the support means C, could exert a tipping action on the base unit B. The cable, when having a properly selected length, quickly indicates to the welding operator when he is approaching the limits of movement away from the base unit B which are safe. The welding operator can then stop his welding operation and move the base unit B closer to the point of the weld.

The welding head A shown in the drawings is illustrative of only one form of welding head which may be employed with the present invention. If desired, other means such as handles or the like can be included in the welding head A so as to facilitate the welding operation. However, the construction of the welding head A forms no part of the present invention and, therefore, the welding head A has not been specifically described.

The principal thing is that the welding head be supported so as to have a maximum freedom of movement with a minimum change of force required to be exerted on the welding head as it is moved within its normal range of operation.

The specific showings of the drawings have been for the purpose of illustrating the invention so that those skilled in the art can readily understand the invention and the showings have been only somewhat schematic because of the wide variations which specific embodiments may take. The principal thing is that the welding head be so supported that it has a maximum freedom of movement and will require the welding operator to exert a minimum amount of force or tension on the welding head in order to effect the desired welds.

It will be obvious that modifications and alterations will occur to others skilled in the art upon a reading and understanding of the specification and it is our intention to include all such modifications and alterations even though differing radically in appearance from the embodiments of the invention shown insofar as they come within the scope of the appended claims.

Having thus described our invention, we claim:

1. Welding apparatus comprising, in combination, a welding head adapted to have welding material fed therethrough toward a workpiece, a base unit adapted to supply welding material to said welding head and mast means mounted on said base unit and extending first upwardly and thence outwardly therefrom, the end of said mast means remote from said base unit being resiliently movable in both a vertical and horizontal direction and at least in part supporting the weight of said welding head.

2. Welding apparatus comprising, in combination, a welding head, a base unit and flexible means interconnecting said welding head and said base unit and adapted to guide welding material from said base unit to said welding head, a mast, at least in part resilient, mounted on said base unit and extending vertically upwardly and horizontally therefrom and an extensible spring suspending said weld head from said mast.

3. Welding apparatus comprising, in combination, a welding head, a base unit and supporting means for said welding head including a mast mounted on said base unit and extending vertically upwardly and horizontally therefrom, said supporting means including a resilient portion urging the outer end of said mast upwardly, the ratio of the change of force to deflection of the resilient portion of said support means being relatively low.

4. Welding apparauts comprising, in combination, a welding head, a base unit and flexible means interconnecting said welding head and said base unit and a mast mounted on said base unit and extending vertically upwardly and outwardly therefrom, said mast being increasingly resilient from said base unit to its outer end and means suspending said weld head from said end.

5. Welding apparatus comprising, in combination, a welding head, a base unit and flexible means interconnecting said welding head and said base unit and mast means mounted on said base unit and extending generally upwardly and outwardly therefrom, said mast means being increasingly resilient toward the outer end, the ratio of the change of force to deflection of said end being relatively low and means suspending said weld head from said end.

6. Welding apparatus comprising, in combination, a welding head, a base unit and flexible means interconnecting said welding head and said base unit and support means mounted on said base unit comprising a resilient mast extending vertically upwardly from said base unit and deflecting toward the outer end thereof to a generally horizontal position under the weight of said welding head suspended from the outer end of said mast.

7. Welding apparatus comprising, in combination, a welding head, a base unit and flexible means interconnecting said welding head and said base unit and support means comprising a rigid mast extending vertically upwardly and also horizontally from said base unit, resiliently extensible means depending from the end of said mast and connecting to said weld head for supporting same.

8. The combination of claim 7 wherein said rigid mast is pivoted about a horizontal axis relative to said base unit, and spring means bridging said pivot and urging said mast to a generally vertical position.

9. Welding apparatus comprising, in combination, a welding head, a base unit and flexible means interconnecting said welding head and said base unit and support means mounted on said base unit and extending vertically upwardly and horizontally therefrom, said support means comprising an elongated mast generally flexible throughout its entire length and a helical coil spring connected between the end of said flexible mast and said welding head.

10. The combination of claim 9 wherein said mast is pivoted at the base unit end thereof about a horizontal axis.

11. Welding apparatus comprising, in combination, a welding head, a base unit and flexible means interconnecting said welding head and said base unit and support means mounted on said base unit and extending vertically upwardly therefrom, said support means including an elongated flexible mast comprised of a long helical coil spring, and means interconnecting said welding head and the end of said mast, the weight of said welding head on said mast causing the end of the flexible mast to flex to a generally horizontal position.

12. Welding apparatus comprising, in combination, a welding head, a base unit and flexible means interconnecting said welding head and said base unit and support means mounted on said base unit extending vertically upwardly and horizontally therefrom, said support means including a flexible mast comprised of a long conically-shaped helical coil spring and means suspending the welding head from the end of said mast.

13. Welding apparatus comprising, in combination, a welding head, a base unit and flexible means interconnecting said welding head and said base unit and support means mounted on said base unit for said welding head, said support means being comprised of a mast member flexible throughout its length mounted on said base unit and extending generally upwardly and thence generally horizontally therefrom, the outer end of said member being resiliently movable in both a horizontal and vertical direction and means supporting said welding head from said end.

14. Welding apparatus comprising, in combination, a welding head, a base unit and means on said base unit from which said welding head is suspended to be supported at a position remote from said base unit, said means including a mast-like member mounted on said base unit and extending generally upwardly and horizontally therefrom, said means being resilient at least at the end thereof remote from said base unit and said mast being resiliently articulated about a horizontal axis turning point effectively adjacent to said base unit.

15. The combination of claim 14 wherein said mast is a rigid member and is pivoted at its base relative to said base unit about a horizontal axis and a resilient spring extends from the outer end of said mast to said welding head to suspend the welding head.

16. The combination of claim 14 wherein said mast is comprised of a long resilient spring-like member which flexes at the outer end to a generally horizontal position under the weight of the welding head, said outer end being movable in both a vertical and a horizontal direction in a plane through the member whereby to permit free movement of the welding head.

17. The combination of claim 14 wherein said mast is comprised of a long helical coil spring which flexes under the weight of the welding head and the outer end thereof is movable in both a vertical and horizontal direction in the vertical plane through the mast.

References Cited in the file of this patent

UNITED STATES PATENTS

| | | |
|---|---|---|
| 1,793,469 | Drake | Feb. 24, 1931 |
| 1,942,453 | Ruemelin | Jan. 9, 1934 |
| 2,402,937 | Stringham | June 25, 1946 |
| 2,445,863 | Sarajin | July 27, 1949 |